Dec. 8, 1964  R. WEISS  3,160,059
MAGAZINE SLIDE PROJECTOR WITH LONGITUDINALLY MOVABLE GUIDE RAIL
Filed March 13, 1962

3,160,059
MAGAZINE SLIDE PROJECTOR WITH LONGI-
TUDINALLY MOVABLE GUIDE RAIL
Richard Weiss, Braunschweig, Germany, assignor to
Rollei-Werke Franke & Heidecke, Braunschweig, Germany, a firm of Germany
Filed Mar. 13, 1962, Ser. No. 179,452
Claims priority, application Germany, Mar. 17, 1961,
F 33,441
8 Claims. (Cl. 88—28)

This invention relates to a magazine slide projector, and particularly to the means for holding or guiding the magazine on the body of the projector.

An object of the invention is the provision of a generally improved and more satisfactory projector of this kind.

Another object is the provision of holding and guiding means so designed as to give satisfactory support to extra long magazines, as well as to magazines of average or standard length.

Still another object is the provision of magazine guiding means so designed and constructed as to facilitate the removal of the side panel of the projector casing or housing, for inspection or repair.

A further object is the provision of magazine guiding and holding means longitudinally movable with respect to the projector, to different positions for accommodating different lengths of magazines, and having ramp means for raising slides to the proper level for insertion in the projection channel, regardless of the longitudinal position of adjustment of the guiding means.

These and other desirable objects may be attained in the manner disclosed as an illustrative embodiment of the invention in the following description and in the accompanying drawings forming a part hereof, in which.

Figure 1:
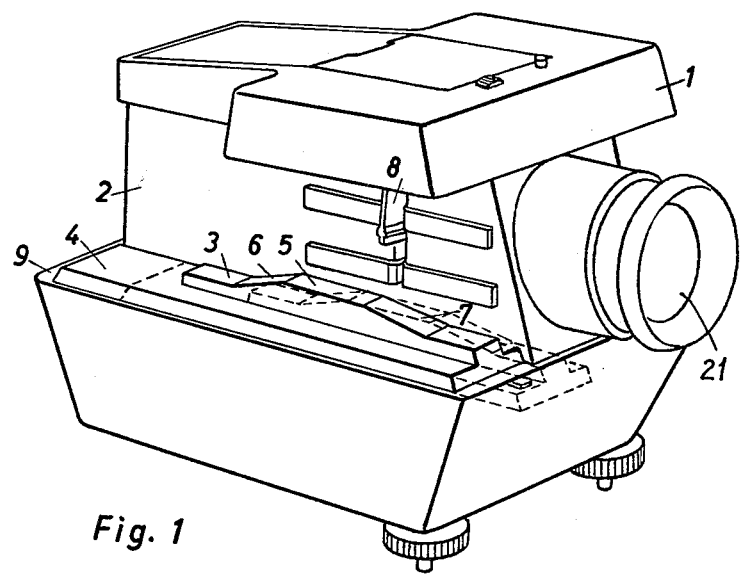
FIG. 1 is a perspective view of a slide projector equipped with guiding and holding means according to the present invention.

Referring first to FIG. 1, there is shown a typical form of projector with which the guiding and holding means of the present invention may be used, the projector being indicated in general at 1. At the front of the projector is a projection lens indicated in general at 21, and rearwardly from this there is a lateral opening 8 forming the external orifice of the usual transverse guide channel or receiving slot into which the slides are moved to place them across the optical axis in proper projection position, and from which they are brought back into the magazine. The housing is extended rearwardly behind the receiving channel 8, and contains in its rearward part the usual source of light (incandescent bulb or the like) and the optical parts associated therewith, such as the reflector and the condenser lens.

One or both sides of the projector are preferably stepped so as to provide an approximately vertical side wall 2 and an approximately horizontal wall 9 extending laterally outwardly from the side wall 2, the angle between the walls 2 and 9 forming the magazine receiving space. The slide magazine extends longitudinally in this notch between the walls 2 and 9, and is moved longitudinally along this notch or guide, to bring successive slides opposite the projection channel 8. The magazine is moved step by step, in any conventional manner, and as each successive slide comes opposite the channel 8, suitable mechanism of known form (the details of which are not important for purposes of the present invention) moves the slide laterally from the magazine into the channel 8 to place the slide in projection position, then when the projection of this particular slide is finished the mechanism moves it back into the magazine, and advances the magazine to bring the next slide therein opposite the channel 8. All of this is familiar to those skilled in the art.

In prior constructions of this same general type, the holding means or guide for the magazine has been placed in stationary position directly on the horizontal shelf 9 of the projector. According to the present invention, however, a movable support member or plate 4 is provided, longitudinally slidable on the shelf or stationary member 9. This member 4 carries the track or guide rail 3 onto which the magazine fits, and also carries the ramp member 5 having oblique or inclined surfaces 6 and 7 at its ends. The bottom of the slide magazine (known per se) has a longitudinal groove which fits over the rail 3, to prevent lateral displacement of the magazine, which can thus move longitudinally along the rail in a direction parallel to the optical axis of the lens. As any particular slide within the magazine approaches the transverse plane of the projection channel 8, the slide is raised upwardly by the inclined ramp portion 6 or 7 as the case may be (depending upon the direction of travel of the magazine, forwardly or backwardly) and then the bottom edge of the slide rides along the horizontal or flat portion 5 of the ramp, at the proper elevation to be moved into the projection slot or channel 8 by the slide moving or transferring mechanism, known per se. As the magazine continues its travel, the slides which have passed the projection position gradually move down the incline at the far end of the ramp, back to their normal elevation in the magazine.

As above stated, the plate 4 is mounted, according to the present invention, for longitudinal movement on the flat wall 9 of the projector, so that this plate 4 can be moved from its normal position shown in full lines in FIG. 1, where the front end of the plate is approximately even with the front end of the main casing of the projector, forwardly to the position shown in dotted lines in FIG. 1, where it projects for some distance forwardly from the main casing. This provides adequate support and guidance for an extra long magazine, when the magazine is advanced forwardly so that the slides near the rear of the magazine are in projection position opposite the projection channel 8. With the plate 4 in normal position, there is sufficient forward extension beyond the channel 8 for projecting the rearmost slide in a magazine of normal or standard length. But if an extra long magazine is used, then by the time the rear end of the magazine is opposite the channel 8, the forward end of the magazine projects so far beyond the front of the main housing or casing that there is danger that the magazine will tip or tilt downwardly at its front end. This danger is obviated according to the present invention by moving the plate 4 forwardly to the dotted line position, where it gives additional and adequate support to even an extra long magazine, when the rear end thereof is at the projection channel 8 for projection of the last slide in the magazine.

Furthermore, according to the present invention, the plate 4 is mounted for rearward movement from its normal position, as well as forward movement, if desired. However, it is pointed out that rearward movement of the plate, to a position extending beyond the rear edge of the main housing of the projector, is seldom necessary, because of the fact that the projection channel 8 is closer to the front edge of the housing than to the rear edge, on account of the space needed behind the channel 8 for the projection lamp and the condenser optical system. Thus, because of the nearness of the channel 8 to the front end of the projector, and the relatively greater distance thereof from the rear end of the projector, it is at the front, rather than at the rear, that extra support is needed when an extra long magazine is used.

Figure 3:
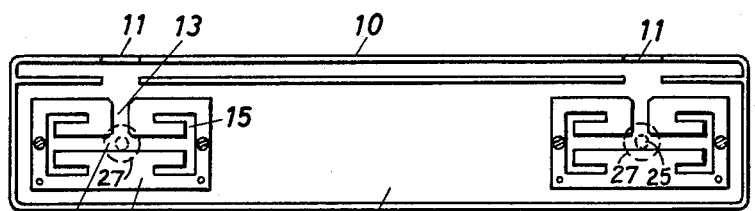
FIG. 3 is a bottom plan view of the holding means.
Figure 2:
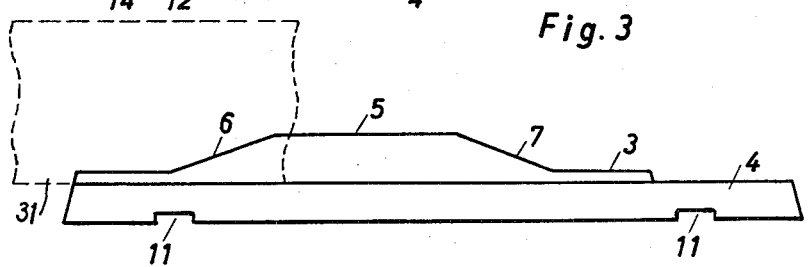
FIG. 2 is a side elevation of the guiding means removed from the projector.

The preferred form of mounting the support plate or rail plate 4 is one which allows the plate not only to be moved forwardly or backwardly from its normal standard position, but also to be removed readily in a lateral direction, so that it offers no impediment to taking the side wall off of the projector for inspection or servicing of parts within. In the preferred construction, the bottom face of the plate 4 is somewhat hollowed out or recessed, to provide a downwardly extending flange or side wall 10 around all four sides. At two points 11 near the front and back ends of the side wall 10 on the inner side or edge (that is, the side which is toward the vertical wall 2 of the projector) there are notches or openings 11, as shown in FIGS. 2 and 3. At the same spacing as these two notches 11, the horizontal wall 9 is provided with two upstanding studs shown schematically at 25 with enlarged heads shown schematically at 27. These studs and their heads are stationary.

Fixed to the under side of the plate 4, opposite the notches 11 are two spring plates 12 spaced downwardly from the under side of the plate 4 by a distance approximately equal to the thicknesses of the heads 27 on the studs. These spring plates have T-shaped guide slots with lateral portions 13 which are alined opposite the notches 11. These lateral portions 13 lead into the mid points of the longitudinal portions 14 of the slots. The slots 13 and 14 are of sufficient width to receive the shanks 25 of the studs or guide pins, but the larger diameter heads 27 of the studs can not pass through the slots 13 and 14, although they can pass through the wider notches 11. By means of the recesses 15 near the ends of the spring plates, a resilient spring action is secured, so that the parts on opposite sides of the guide slots 14 form, in effect, spring tongues pressing resiliently upwardly on the bottom faces of the heads 27 of the studs. The lengths of the slots 14 determine the extent to which the plate 4 may move forwardly or backwardly along the body of the projector.

When the plate 4 is moved to a position in which the studs are opposite the slots 13, the entire plate 4 may then be removed laterally from the projector, the studs sliding out through the slots 13 and the heads of the studs sliding out through the notches 11. The entire plate 4 may be placed back on the projector by a reverse operation, and then may be moved longitudinally either forwardly or backwardly from its central position, to the extent permitted by the lengths of the slots 14, the plate 4 meanwhile being held firmly down on the horizontal wall 9 of the projector by reason of the spring action of the metallic plates 12 gripping resiliently the heads 27 of the studs.

This arrangement gives adequate support for an extra long magazine, as above stated, but accomplishes this without lengthening the casing of the projector, and without having any overhanging or projecting part likely to be damaged when the projector is picked up to move it from one location to another, since the guide plate 4 can be pushed back to a position flush with the end of the projector, whenever it is desired to move the projector. Moreover, the mounting of the plate 4 in the way described, easily removable from the projector, permits different plates of different lengths to be detachably mounted on the projector, if desired.

It will be noted that the flat top portion 5 of the ramp is long enough so that a part of this flat portion is opposite the projection channel 8 in all adjusted positions of the plate longitudinally along the projector. Thus it is insured that in any position of the guide plate, whether in its normal position or whether it is moved to its extreme forward position or to its extreme rearward position, the slide which has been brought opposite the projection channel 8 will have been raised by the ramp to the proper elevation to be moved into the projection channel.

A fragment of a slide magazine mounted on the supporting and guiding means 4, 3, 5 is shown schematically at 31.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A magazine slide projector of the type having a projector body with a slide receiving channel for holding a slide in projection position, and a guiding rail mounted on said body for guiding a magazine for longitudinal movement past said channel to bring successive slides in the magazine to positions opposite the channel, said guide rail remaining stationary relative to the projector body during movement of the magazine along the guide rail, characterized by the fact that said guide rail is mounted for longitudinal movement along said body, so that it may be projected beyond said body at one end, to provide extra support for a magazine.

2. A construction as defined in claim 1, further including headed studs mounted in stationary position on said body, and means operatively connected to said rail and forming slots for receiving said studs to hold said rail in a predetermined selected position relative to said projector body, while a magazine travels along said rail.

3. A construction as defined in claim 2, in which said slot forming means includes spring means pressing resiliently against the heads of said studs.

4. A construction as defined in claim 2, in which said slots are of approximately T-shape, having a longitudinal portion along which said studs may slide during longitudinal adjustment of said rail, and a lateral portion intermediate the ends of the longitudinal portion, through which lateral portion the studs may slide to disconnect the slot forming means entirely from said studs.

5. A magazine slide projector of the type having a projector body with a slide receiving channel for holding a slide in projection position, and a guiding rail mounted on said body for guiding magazine for longitudinal movement past said channel to bring successive slides in the magazine to positions opposite the channel, said guide rail remaining stationary relative to the projector body during movement of the magazine along the guide rail, characterized by the fact that said guide rail is mounted for longitudinal movement along said body, so that it may be projected beyond said body at one end, to provide extra support for a magazine, said guide rail including a ramp portion for raising successive slides to a predetermined projection elevation as a magazine containing slides moves along said rail, said ramp portion being sufficiently long to hold a slide at proper projection elevation whenever such slide reaches the plane of said channel, regardless of the longitudinally adjusted position of said rail.

6. A photographic slide projector of the magazine type comprising a projector body element having a predetermined slide projection plane, a guiding rail for guiding a slide magazine for longitudinal movement to bring successive slides in the magazine to said projection plane, a supporting plate element on which said guiding rail is mounted, and connecting means including a fixed member on one of said elements and a resilient member on the other of said elements for resiliently gripping the fixed member in any one of a plurality of positions of said supporting plate element relative to said projector body element, for holding said rail supporting element in any one of a plurality of adjusted positions with respect to said projector body element.

7. A construction as defined in claim 6, in which said fixed member includes a headed stud on said projector body element, and in which said resilient member includes a metallic spring plate on said rail supporting plate element.

8. A construction as defined in claim 7, in which said metallic spring plate includes a longitudinal slot embracing said stud, said slot being sufficiently long so that while said spring plate remains in embracing relation to said stud, said rail supporting plate element may be moved from a position wholly overlying said projector body element to a different position projecting at one end beyond said projector body element in overhanging relation thereto.

References Cited by the Examiner
UNITED STATES PATENTS

| | | | |
|---|---|---|---|
| 893,187 | 7/08 | Montague | 312—335 |
| 2,056,407 | 10/36 | Metcalf | 312—335 |
| 2,878,604 | 3/59 | Mulch | 88—28 |

ROBERT L. EVANS, *Primary Examiner.*

EMIL G. ANDERSON, *Examiner.*